United States Patent
Emmerich et al.

(10) Patent No.: US 9,077,740 B2
(45) Date of Patent: Jul. 7, 2015

(54) SYSTEM AND METHOD FOR POOLING AND LOAD DISTRIBUTING CONNECTION-ORIENTED SERVERS

(75) Inventors: Mark Emmerich, San Jose, CA (US); Christophe Le Rouzo, Houston, TX (US); Kent Parker, Roseville, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2379 days.

(21) Appl. No.: 11/980,900

(22) Filed: Oct. 31, 2007

(65) Prior Publication Data

US 2009/0113531 A1    Apr. 30, 2009

(51) Int. Cl.
| | | |
|---|---|---|
| G06F 17/30 | (2006.01) | |
| G06F 7/04 | (2006.01) | |
| H04L 29/08 | (2006.01) | |
| H04L 29/06 | (2006.01) | |

(52) U.S. Cl.
CPC .............. *H04L 67/141* (2013.01); *H04L 63/20* (2013.01); *H04L 67/14* (2013.01); *H04L 67/1002* (2013.01); *H04L 67/10* (2013.01); *H04L 67/1017* (2013.01)

(58) Field of Classification Search
None
See application file for complete search history.

(56) References Cited

U.S. PATENT DOCUMENTS

| | | | | |
|---|---|---|---|---|
| 5,974,443 | A * | 10/1999 | Jeske | 709/202 |
| 7,743,155 | B2 * | 6/2010 | Pisharody et al. | 709/227 |
| 2002/0055989 | A1 * | 5/2002 | Stringer-Calvert et al. | 709/220 |
| 2002/0161476 | A1 * | 10/2002 | Panofsky et al. | 700/231 |
| 2005/0132030 | A1 * | 6/2005 | Hopen et al. | 709/223 |
| 2008/0267178 | A1 * | 10/2008 | Emmerich et al. | 370/389 |

OTHER PUBLICATIONS

Gong, Li, "Enclaves: Enabling Secure Collaboration Over the Internet," IEEE Journal on Selected Areas in Communications, vol. 15, No. 3, Apr. 1997.*

* cited by examiner

*Primary Examiner* — Kaveh Abrishamkar
(74) *Attorney, Agent, or Firm* — Internationa IP Law Group, P.C.

(57) ABSTRACT

There is provided a system and method for managing connections between computers and a server pool. An exemplary system comprises a file configured to store a list of a plurality of servers in the server pool. The exemplary system further comprises a session distributor configured to distribute communication sessions among the plurality of servers by directing multiple requests for a common communication session to a specific one of the plurality of servers based on the list. The exemplary method includes selecting a server from a list of a plurality of servers stored in a file, selecting a port number, generating login information, and linking the server, port number, and login information such that multiple requests for a common communication session are directed to the server.

10 Claims, 3 Drawing Sheets

SYSTEM AND METHOD FOR POOLING AND LOAD DISTRIBUTING CONNECTION-ORIENTED SERVERS

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer networking, providing communication sessions between computers via a secure server may be facilitated by various network protocols, such as the secure shell (SSH) protocol. An SSH connection secures communications between computers, such as two computers connecting via a common SSH server, via encryption of the communication and authentication. Once this connection is set up between the two computers (via the SSH server), no other computers can join the connection to collaborate or otherwise participate in the session (e.g., to listen in on the network "conversation").

One example of a situation in which such a connection may be desirable is when a computer user requires help from a support technician. To allow the support technician to connect to the customer's computer via the internet, a form of bridging needs to be established. Two strategies for connecting the computers of the customer and the support technician are to set up a virtual private network between the two or set up a port-forwarding session along the same route. Port forwarding is desirable because it provides advantages in simplicity and connection setup time.

To facilitate repair of a customer's computer, it may be desirable to allow the support technician to take control of the customer's computer via a remote control program. Such programs generate a substantial amount of network traffic. As a result, an SSH server may be limited in the number of connections that may be supported. As additional SSH servers are added to a system, a reliable method of providing a connection between the support technician and the customer via the same server is needed. In other words, an SSH connection needs to be established between the two computers via the same SSH server. For instance, a viewer application on the support technician's computer must connect to the same port-forwarding SSH server as a screen server application on the customer's computer.

A hardware load balancer can be introduced to distribute the work load across a pool of servers, but such a load balancer does not guarantee that all requests for the same session will go to the same server. Typical hardware load balancers are ineffective at ensuring that connections will be assigned to the same SSH server, because the requests to initiate the communication session originate as two separate requests (i.e., one from the customer and one from the support technician). Furthermore, a hardware load balancer introduces a new potential bottleneck, a potential single-point-of-failure, and additional hardware and maintenance costs. An improved system and method of distributing connection requests among a pool of secure servers is desirable.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention employ a secure server on the internet to provide a connection between two computers. In particular, exemplary embodiments of the invention relate to effectively distributing requests for communication sessions among a plurality of secure servers.

Figure 1:
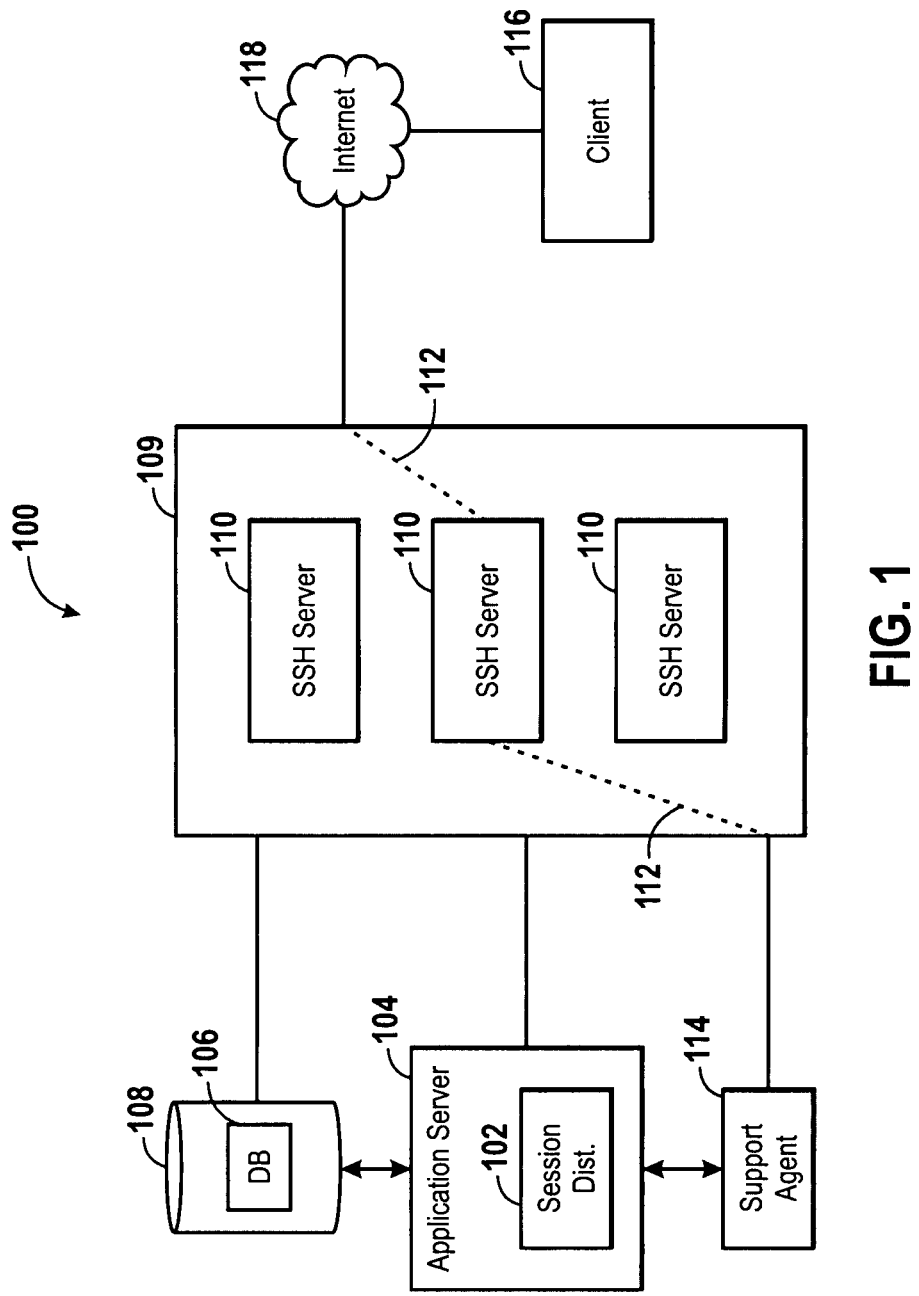
FIG. 1 is a block diagram of a remote control system using SSH server pooling in accordance with an exemplary embodiment of the present invention.

FIG. 1 is a block diagram of a network application using SSH server pooling according to an exemplary embodiment of the present invention. The server pooling system is generally referred to by the reference number 100. The server pooling system 100 comprises a session distributor 102 running on an application server 104 and a file such as a database file 106 that may be on a database server 108. In other embodiments, the session distributor 102 and database 106 may be on the same server, or the session distributor 102 may be on a third server. The system also includes an SSH server pool 109 having a plurality of SSH Servers 110, and may include any number of SSH servers depending on the scalability requirements of the system 100, such as the number of support agent, number of clients, etc. Redundancy for the database server 108 and the application server 104 may be ensured through conventional networking techniques, such as use of a load balancer and multiple servers as would be typical for a fault-tolerant networking implementation.

In a remote control application or any other application in which it is desirable to provide a connection between two computers via a common secure server, a support agent's computer system 114 may desire to connect to a client computer system 116. For purposes of simplicity, only one support agent's computer 114 and one client computer 116 are shown in FIG. 1. Those of ordinary skill in the art will appreciate that exemplary embodiments of the present invention may be adapted to support numerous support agent computers by providing secure connections to numerous client computer systems 116.

The support agent's computer system 114 may connect to the client's computer system 116 over a network 118, such as the Internet, of which the SSH server pool 109 may form a part. In one exemplary embodiment, the support agent's computer 114 may be located in a call center, while a customer's computer 116 may be located in a home or office and may be on a separate LAN. Further, the support agent's computer 114 and/or the customer computer 116 may behind a firewall (not shown) that limits incoming and/or outgoing connections. The support agent's computer 114 and the customer's computer 116 may each be a notebook computer, desktop computer, a server, a thin or thick client, a personal data assistant, or the like.

In accordance with an exemplary embodiment of the present invention, the session distributor 102 is adapted to distribute connections among the SSH server pool 109. Each connection between an individual support agent computer 114 and customer computer 116 may be authenticated and secured via use of one of the SSH servers 110. Moreover, the session distributor 102 is adapted to distribute sessions across the SSH servers 110 to ensure efficient use of server resources and prevent overload of any one of the SSH servers 100.

As will be described in more detail below with reference to FIG. 2, the session distributor 102 distributes sessions among the SSH servers 110, manages port numbers for the SSH servers, and manages sessions credentials used for the communication session (not the same as used to login), for the support agent computer 114 and customer computer 116. Moreover, the session distributor 102 ensures that the support agent computer 114 and the client computer 116 establish a connection on the same SSH server 110, as shown in FIG. 1 by the dashed lines 112.

In one exemplary embodiment, a session may be initiated upon request by the support agent computer 114 and the customer computer 116. To create the session and connection between the support agent 116 and client 116, the session distributor 102 identifies the SSH server 110 from the SSH server pool 109 to be used for the connection, such as by selecting from one or more tables on the database 106. The database 106 may store a list of IP addresses, names, and/or other identifiers of the SSH servers 110 in the SSH server pool 109, and a list of allocated ports for each of the SSH servers 110. Other tables on the database 106 may include session credentials, a list of excluded servers, such as those servers that are not responding to requests, and/or a list of excluded ports, such as those ports that are already in use by other networking applications on each server.

The session distributor 102 receives initial requests from the support agent's computer 114 and the client computer 116. The session distributor 102 then directs both the support agent's computer 114 and the customer's computer 116 to form a connection on a particular one of the SSH servers 110 that comprise the SSH server pool 109. In an exemplary embodiment of the present invention, the session distributor 102 locates the next free SSH server, looks up the next free port on that server, and allocates a user/port/server to the session request.

An application such as a screen serving application running on the customer's computer 116 may use the information provided by the session distributor 102 to join a connection on the particular one of the SSH servers 110 using the port and session credentials indicated by the session distributor 102. Thus, for example, the customer's computer 116 sets up port forwarding using the correct port on the SSH server 110 through a firewall between the customer's computer 116 and the network 118. By way of example, an outgoing traffic port on the customer's computer 116 may be 50, while the incoming traffic port on the particular SSH server 110 assigned to a connection may be port 22, as is commonly used for SSH. The session distributor 102 additionally delivers the session information to the support agent's computer 114. The support agent's computer 114 may join the connection on the particular one of the SSH servers 110 via an application such as a remote control application using the port and session credentials provided by the session distributor 102.

For subsequent session and connection requests, the session distributor 102 may select the next SSH server 110 in the server pool 109 from the list of SSH servers stored on the database 106, thus using, for example, a "round-robin" selection technique to distribute communication requests. If one of the pool of SSH servers 109 is unresponsive, such as due to a hardware or software error, that SSH server may be marked as unavailable or skipped in the list of available servers on the database 106, and therefore removed from the server pool 109 until it is available again. In this manner, problems with an SSH server may be resolved without affecting the functionality of the server pool 109. Other exemplary embodiments may include additional actions if an SSH server is unresponsive, such as event reporting, automatic restarting or the like.

Figure 2:
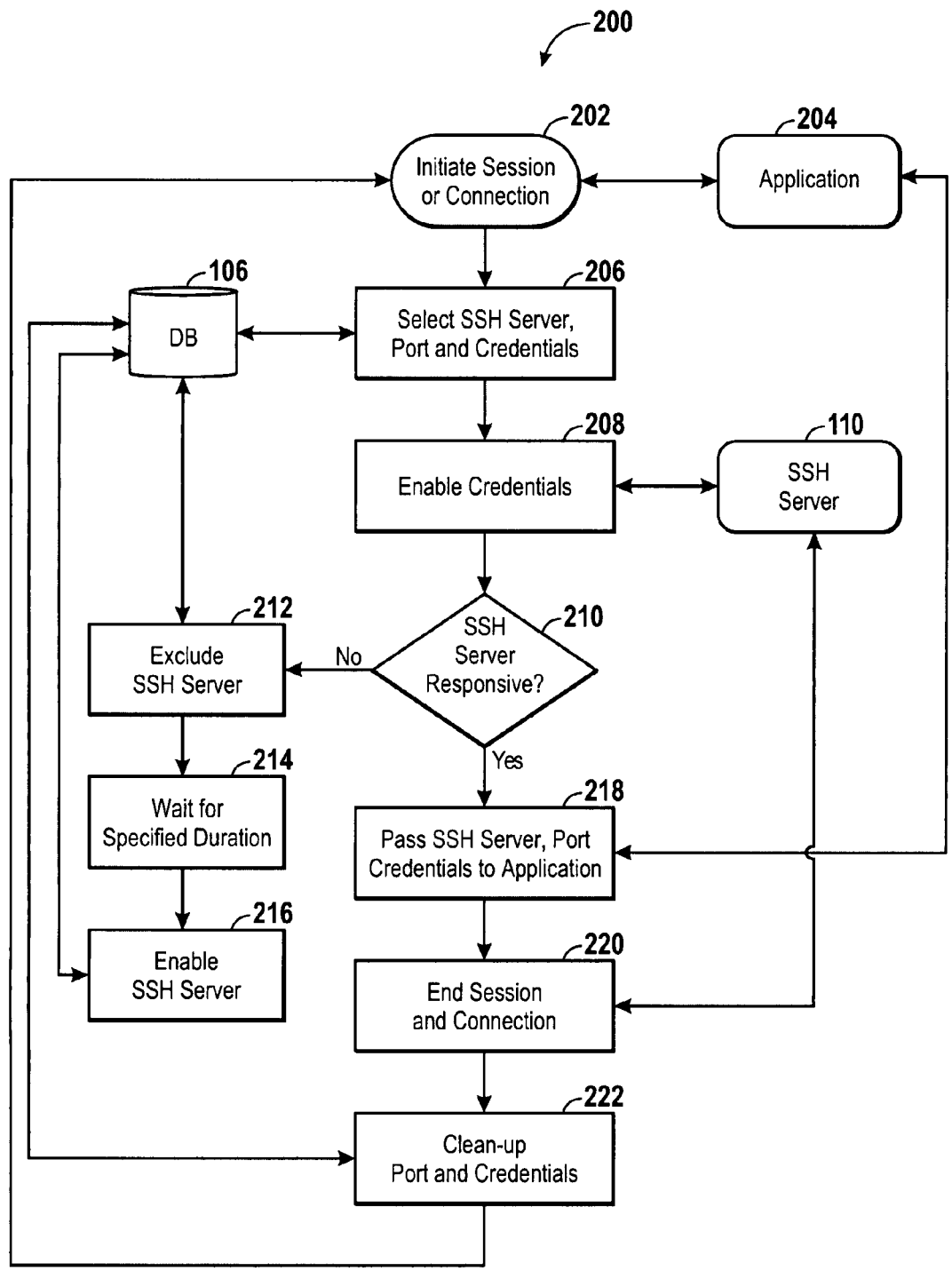
FIG. 2 is a flow chart of a session distribution process for a remote control system using SSH server pooling in accordance with an exemplary embodiment of the present invention.

FIG. 2 is a flowchart illustrating a process 200 for allocating the SSH server pool 109 and distributing sessions in accordance with an exemplary embodiment of the present invention. Initially, the connection distributor 102 receives requests to establish a communication session from a support agent's computer 114 and a customer's computer 116 (block 202), such as through remote control or managed services application 204. The session distributor 102 selects, retrieves and/or generates an SSH server identification, e.g. an IP address, a port for the SSH server, and login credentials (block 206). In one exemplary embodiment, this information may be selected from the database 106. The login credentials are enabled, such as by retrieving a login name and password from the SSH server 110 (block 208). The SSH server 110 is responsible for ensuring that the credentials are enabled and usable. If the SSH server is unresponsive (decision block 210), the SSH server is excluded from the list of available servers in the server pool 109 (block 212), such as by modifying a table on the database 106. After a specified duration (block 212), the SSH server may be placed back into the list of available servers in the pool 109 (block 216), such as by modifying a table on the database 106. Alternatively, the date/time of the last failure may be recorded to allow that server to be skipped whenever the date/time entry is within a specific time period (for example, the past eight minutes).

Once the information for a connection is available, the session distributor 102 may pass the connection information to support technician's computer 114 and the customer's computer 116 (block 218). The support agent's computer 114 and customer's computer 116 may then use the connection information to setup a port-forwarding bridge and a connection using the specified SSH server.

Once the connection is no longer needed, such as after completion of a remote control session, the application 204 running on the support technician's computer 114 or the customer's computer 116 may request the session distributor to end the session (block 220). As discussed further below, after the session is ended, the session distributor 102 "cleans-up" the session and connection information, i.e., the port and credentials, such as by modifying tables on the database 106 (block 222). The credentials may be removed from a table on the database 106 so that the credentials are no longer usable. The process 200 may then begin again upon receiving a request for initiation of another session and connection.

Figure 3:
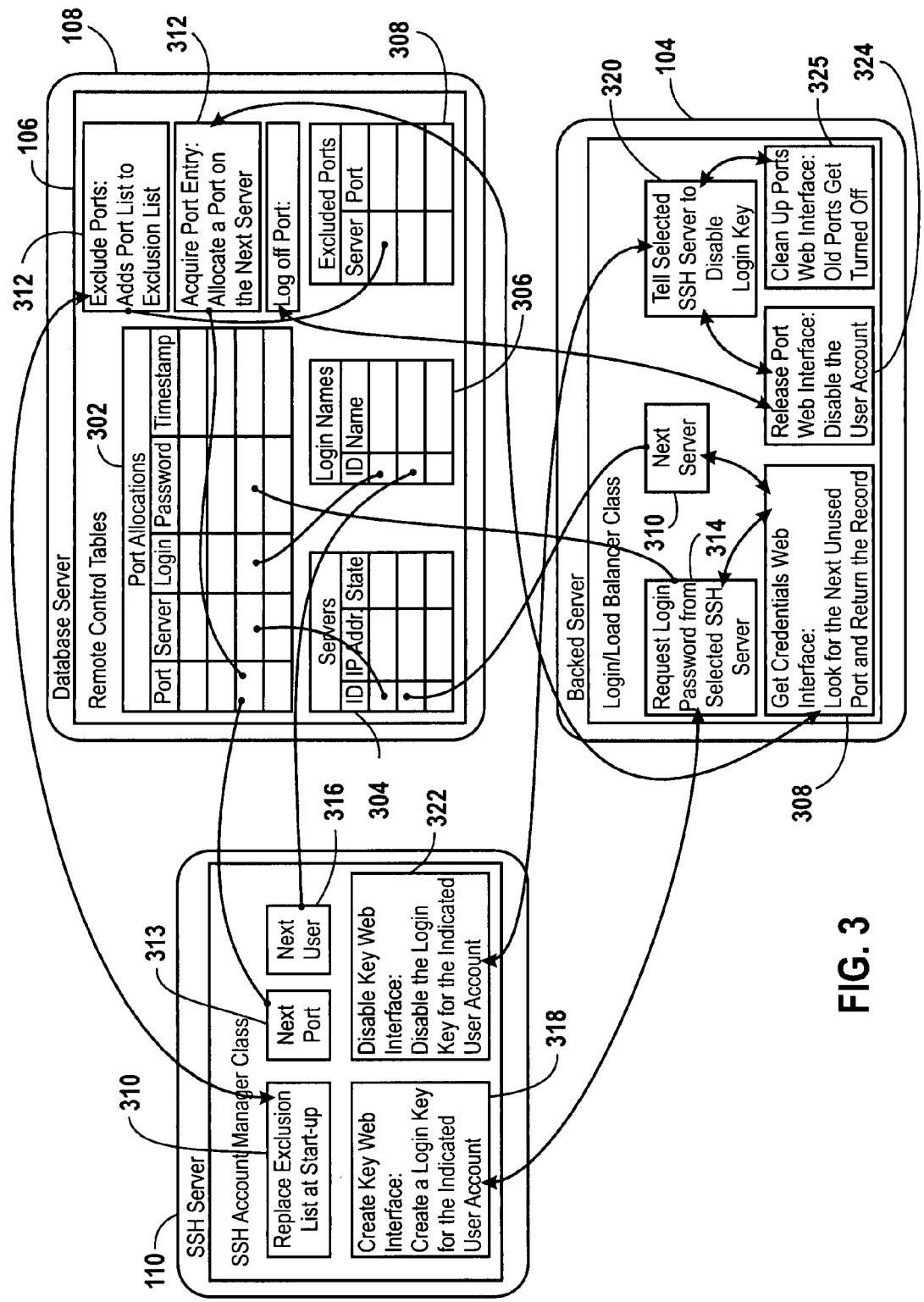
FIG. 3 is a flow chart showing a method of providing remote control access to a computer according to an exemplary embodiment of the present invention.

To further illustrate the process 200 of FIG. 2, communications between the application server 104, the database server 108 and one of the SSH servers 110 are depicted in FIG. 3, which is a flow chart showing a method of providing remote control access to a computer according to an exemplary embodiment of the present invention. In FIG. 3, the database server 108 maintains a connection database 106 having various tables. The application server 104 and the SSH server 110 are shown to depict actions taken by one or more applications running on each server. In addition, various lines between each table and action indicate a relationship, such as an exchange of data. Those of ordinary skill in the art will appreciate that the arrangement of components shown in FIG. 3 is exemplary only and is not intended to limit the scope of the invention. Those of ordinary skill in the art will appreciate that FIG. 3 omits extraneous details regarding the structure of the database and the SSH login components for purposes of clarity.

Beginning with the database server 108, the database 106 includes a port allocations table 302, a server table 304, a login names table 306, and an excluded ports table 308. The port allocations table 302 may include the following columns: port (port number), server, login, password, and timestamp. The server table 304 may include the following columns: id, ip addr (IP address), and state. The login names table 206 may include the following columns: id, and name. Finally, the excluded ports table may include the following columns: server and port (port number).

Upon start-up of the SSH server 110, the SSH server 110 may replace the port exclusion list (block 310) by sending a request to the database 106 to add ports (block 312) to the excluded ports table 308. The excluded ports table 308 maintains a list of those ports that are currently in use for other connections. In an exemplary embodiment of the present invention, excluded ports for one of the servers are purged and a new list of ports is added. Replacing the ports on start-up ensures that an SSH server has made as many as possible of its ports available for use by the session distributor 102.

Initially, the port allocations table 302 is empty and will be populated as connections are created and SSH servers and corresponding ports are allocated. The sever table 304 may be pre-populated with the list of servers in the server pool 109. Servers may be added or removed to the servers table 304 manually, or dynamically by software. The login names table 306 may be pre-populated with login names, and each login name may be preconfigured for use with the SSH server pool 109, such as by creating and/or enabling on each SSH server 110. If the session distributor 102 on the application server 104 requests new session credentials (block 308), the next SSH server 110 in the SSH server pool 109 is selected (block 310) from the servers table 304, and the next available port for that server is allocated from port allocation table 302 (block 313). The port allocation may include checking the excluded ports table to ensure that the allocated port for that server is not already in use.

In one exemplary embodiment, the session distributor 102 may request a login name and password (block 314) from the SSH server 110. The next available login name for that SSH server is selected from the login names table 306 (block 316) and assigned to the SSH server and port, such as by entry into the port allocation table 302 (block 313). An SSH server, port, and login name, corresponding to one record in the port allocations table 302, are now available for a connection. The session distributor 102 may then request a login password (block 314) from the SSH server 110.

After the session distributor 102 has the connection information for a session, such as the SSH server, port, login name, and password, the session distributor 102 may pass those credentials to the calling application, such as the remote control or managed services application that initiated the session. The connection information may be returned to the calling application in any manner, such as a text string, binary, etc. In one exemplary embodiment, the session credentials are returned to the calling application as a string, in which the string may be the connection information concatenated together. The calling application receives the connection information for the session and can establish a connection using one SSH server from the server pool 109. Additionally, the session distributor 102 and port allocation table 302 ensure that one SSH server is used for the entire duration of the connection.

If another or the same calling application requests another session, the session distributor 102 continues to allocate servers and ports in the manner described above. When the next server is requested (block 310), the next server in the servers table 304 is selected. Thus, in this manner, the servers are allocated in a "round-robin" method so that the most recently used server will be at the end of the list. The next port is selected by checking the excluded ports table for that SSH server, and the next login is selected from the login names table.

Finally, the SSH server pooling solution described herein provides automatic recovery from communications failure and restarts. As described above, if an SSH server is unresponsive, it may be removed from the server table, and therefore from available SSH server pool, for a specified duration. The server may then be restarted or otherwise configured to address the failure without impacting the SSH server pool.

FIG. 3 also depicts the actions for ending a session according to an exemplary embodiment of the present invention. If the session ends and the connection between is or should be closed, the session distributor 102 sends a message to the SSH server to disable the login key for that session (block 320). The SSH server 100 disables the login key for that login name (block 322), thus ensuring that the password generated for that session and connection will no longer be valid. In some exemplary embodiments, the login name may also be disabled by removing the login name from the login names table 306 or by communication with the OS on the SSH server to disable the account.

The session distributor 102 may also clean up ports by "turning off" old ports (block 325), i.e. removing the records for those ports from the port allocation table 302. Thus, any session that has "timed out," been dropped by either the client or the support technician, or ended for any unexpected reason may be cleaned up by removing those records from the port allocation table 302. In one implementation, the port allocation table 302 may also include fields for a timestamp for when the port was allocated and the expected maximum duration of the connection. The session distributor 102 may clean up the ports by checking the port allocation table 302 and, by comparing the time the port was allocated and the expected maximum duration fields, expire any ports that have remained allocated beyond the expected maximum duration. In an alternative embodiment, the ports may remain active beyond their maximum expected duration until another port allocation request is received and the port is needed for allocation. For example, the ports allocation table 302 may remain useful for extended periods, even if multiple sessions and connections have ended unexpectedly and not been removed from the port allocation table.

In an exemplary embodiment using the port clean-up techniques described above, the expected maximum duration for a connection may vary by application. For example, a support call leading to a remote control session may only require an average 15 minute connection, in which case the maximum expected duration may be about 60 to 90 minutes. Alternatively, a managed services session may last two to four hours, resulting in an expected maximum duration of about 12 to 18 hours. In such an embodiment, the expected maximum duration may be set by the session distributor 102 or the calling application depending on the type of session that is requested.

As mentioned above, one or more of the particular embodiments disclosed herein may be used with any network protocol or port-forwarding technique, are not limited the SSH protocol or port-forwarding connections. Further, the server pooling techniques may be used inside a LAN, over a WAN, the Internet or any other network. In addition, any type of application requiring a connection between a client and server using a suitable network protocol may use the session distributor and server pooling techniques described herein. Moreover, exemplary embodiments of the present invention are useful any time two distinct clients need to connect to the same server in a pool.

While the invention could be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for managing connections between computers and a server pool, comprising:
    a file stored on a first server and configured to store a list of a plurality of servers in the server pool; and
    a session distributor executed on the first server or a second server and configured to distribute, via round-robin distribution, communication sessions among the plurality of servers by directing multiple requests for a common communication session to a specific one of the plurality of servers based on the list, wherein after the specific one of the plurality of servers receives the common communication session, the specific one of the plurality of servers is stored at the end of the list.

2. The system of claim 1, wherein the plurality of servers comprises secure shell (SSH) servers operating according to an SSH network protocol.

3. The system of claim 1, wherein the session distributor is configured to provide information identifying the specific one of the plurality of servers to a source of each of the multiple requests for the common communication session.

4. The system of claim 1, wherein the session distributor is configured to provide a port number to a source of each of the multiple requests for the common communication session.

5. The system of claim 1, wherein the session distributor is configured to provide a login and a password to a source of each of the multiple requests for the common communication session.

6. The system of claim 1, wherein the session distributor is configured to provide a timestamp to a source of each of the multiple requests for the common communication session.

7. The system of claim 1, wherein the file is configured to store information about the common communication session.

8. The system of claim 1, wherein the session distributor is configured to update server status information in the file if the common communication session terminates.

9. A system, comprising:
    a server pool that includes a plurality of servers implementing a network protocol;
    an application server, wherein the application server is configured to distribute communication sessions among the plurality of servers in the server pool; and
    a database server configured to store a list of the plurality of servers, the application server being configured to direct multiple requests for a common communication session to a specific one of the plurality of servers in the server pool in a specific order based on the list.

10. The system of claim 9, wherein the plurality of servers comprises secure shell (SSH) servers and the network protocol comprises SSH.

\* \* \* \* \*